US010611187B1

(12) United States Patent
Mason

(10) Patent No.: US 10,611,187 B1
(45) Date of Patent: Apr. 7, 2020

(54) WHEEL RIM PROTECTIVE DISK

(71) Applicant: John Mason, Long Beach, CA (US)

(72) Inventor: John Mason, Long Beach, CA (US)

(*) Notice: Subject to any disclaimer, the term of this patent is extended or adjusted under 35 U.S.C. 154(b) by 101 days.

(21) Appl. No.: 15/866,627

(22) Filed: Jan. 10, 2018

(51) Int. Cl.
B60B 7/01 (2006.01)
B60B 7/06 (2006.01)
B60B 7/00 (2006.01)

(52) U.S. Cl.
CPC ............... *B60B 7/063* (2013.01); *B60B 7/01* (2013.01); *B60B 7/0066* (2013.01)

(58) Field of Classification Search
CPC .... B60B 7/01; B60B 7/04; B60B 7/06; B60B 7/063; B60B 7/14
See application file for complete search history.

(56) References Cited

U.S. PATENT DOCUMENTS

| 3,891,276 | A  | * | 6/1975  | Spisak ...................... B60B 7/01 301/37.24 |
| 5,967,212 | A  |   | 10/1999 | Hameed |
| 6,527,346 | B2 | * | 3/2003  | Chen ........................ B60B 3/044 301/37.101 |
| 6,916,072 | B2 | * | 7/2005  | Bernoni .................... B60B 7/01 301/37.24 |
| 7,296,860 | B2 |   | 11/2007 | Dangleman |
| 7,922,259 | B2 | * | 4/2011  | Chiu ......................... B60B 7/01 301/37.24 |
| 8,147,004 | B2 | * | 4/2012  | Milicevic .................. B60B 7/01 301/37.23 |
| 8,459,752 | B2 | * | 6/2013  | Russell ..................... B60B 7/063 301/37.102 |
| 8,770,670 | B2 |   | 7/2014  | Chester et al. |
| 8,876,222 | B2 | * | 11/2014 | Seradarian ................ B60B 7/01 301/37.22 |
| 2009/0026832 | A1 | * | 1/2009 | Baumgartner ............ B60B 7/01 301/37.24 |
| 2012/0181849 | A1 | * | 7/2012 | Rogers ...................... B60B 7/00 301/37.24 |
| 2013/0340908 | A1 | * | 12/2013 | Wirth ........................ B60B 7/01 152/450 |
| 2014/0197674 | A1 | * | 7/2014 | Woolley .................... B60B 7/01 301/5.21 |

* cited by examiner

*Primary Examiner* — Jason R Bellinger

(57) ABSTRACT

A wheel rim protective disk having a reinforcement spine continuously disposed from a wheel side to a depth less than a thickness of the protective disk. A first embodiment mounts to a wheel having a channel with a second width substantially conforming to a width of the protective disk, and a second depth less than the thickness of the protective disk. A plurality of receiving apertures is disposed through the channel to align with a plurality of mounting apertures in the protective disk. In an alternative embodiment, the protective disk mounts to a mounting disk that in turn mounts to a second wheel having a second plurality of mounting apertures. The mounting disk has the channel, the lower section and the plurality of receiving apertures. In a second alternative embodiment, the protective disk mounts to a 3D printed, contoured mounting disk that in turn mounts to a standard factory wheel.

3 Claims, 5 Drawing Sheets

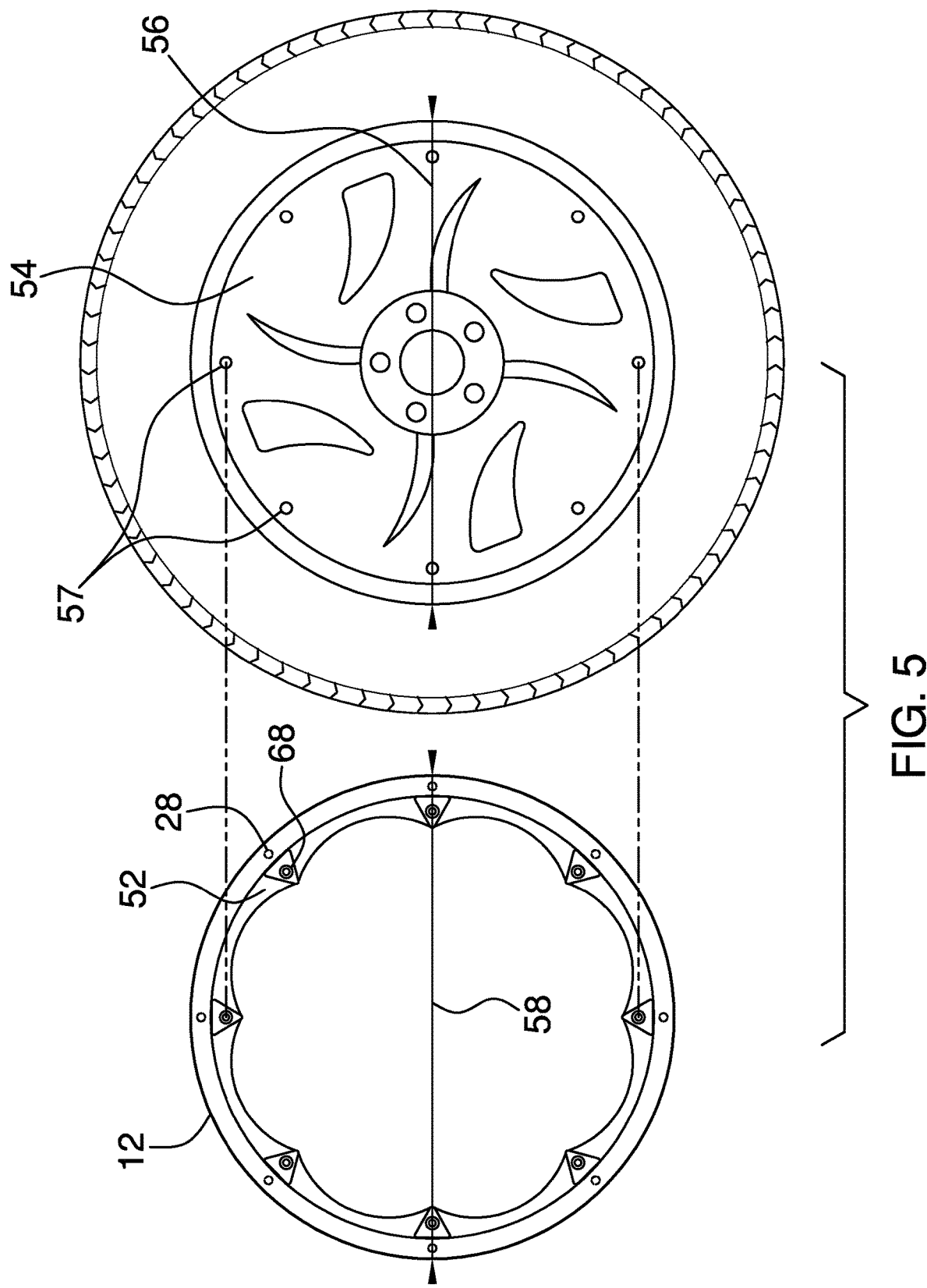

WHEEL RIM PROTECTIVE DISK

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various types of wheel protection mechanisms are known in the prior art. Automotive rims can prove to be an expensive enhancement to a vehicle, yet they are easily marred by a curb or other obstacle while parking. What is needed, and what the present wheel rim protective disk provides, is a wheel rim protective disk that is removably installable on a vehicle wheel to protect the rim and to further personalize the aesthetic of the wheel. What is needed is a protective disk having a reinforcement spine and a plurality of mounting apertures, as well as a wheel having a channel with a plurality of receiving apertures that align with the mounting apertures. Alternatively, what is needed is a mounting disk that in turn mounts to a second wheel having a second plurality of mounting apertures. The mounting disk has the channel, the lower section and the plurality of receiving apertures. Finally, what is needed is a 3D printed, contoured mounting disk to mount the protective disk to a standard factory wheel.

FIELD OF THE INVENTION

The present invention relates to automotive accessories, and more particularly, to a wheel rim protective disk.

SUMMARY OF THE INVENTION

The general purpose of the present wheel rim protective disk, described subsequently in greater detail, is to provide a wheel rim protective disk that has many novel features that result in a wheel rim protective disk that is not anticipated, rendered obvious, suggested, or even implied by prior art, either alone or in combination thereof.

To accomplish this, the present wheel rim protective disk includes a protective disk having an outer diameter, a width, a thickness, a curb side, and a wheel side. The protective disk is ideally a plastic material such as a high-density nylon. The protective disk can be produced in a variety of colors and designs. A reinforcement spine is continuously disposed within the protective disk from the wheel side to a depth, wherein the depth is less than the thickness of the protective disk. The reinforcement spine can be an alloy material to strengthen the protective disk, particularly at a first plurality of mounting apertures disposed on the wheel side of the protective disk.

A first embodiment of the invention includes a plurality of T-nuts, wherein each T-nut of the plurality of T-nuts is disposed within each mounting aperture of the first plurality of mounting apertures. This first embodiment of the invention mounts to a wheel having a second outer diameter substantially conforming to the outer diameter of the protective disk, and a channel continuously disposed along an outer edge of the wheel. The channel has a second width substantially conforming to the width of the protective disk, and the channel has a second depth less than the thickness of the protective disk. A plurality of receiving apertures is disposed through the channel of the wheel, wherein each receiving aperture of the plurality of receiving apertures aligns with each mounting aperture of the plurality of mounting apertures. This wheel is either a manufactured integrated wheel, or a standard wheel with machined modifications, namely the channel and the plurality of receiving apertures. A plurality of T-bolts is selectively engageable with each T-nut of the plurality of T-nuts. Each T-bolt of the plurality of T-bolts is configured to pass through each receiving aperture of the plurality of receiving apertures to engage each T-nut of the plurality of T-nuts, thus securing the protective disk to the wheel.

In an alternative embodiment of the invention, the protective disk mounts to a mounting disk that in turn mounts to a second wheel, which is also a manufactured integrated wheel or machine customized wheel. The second wheel has a third outer diameter substantially conforming to the outer diameter of the protective disk, and a second plurality of mounting apertures. The mounting disk has a fourth outer diameter substantially conforming to the outer diameter of the protective disk, the channel continuously disposed along an upper edge of the mounting disk, and a lower section from the channel to a lower edge of the mounting disk. The channel has a second width substantially conforming to the width of the protective disk, wherein the channel has a second depth less than the thickness of the protective disk. The plurality of receiving apertures is disposed through the channel of the mounting disk, wherein each receiving aperture of the plurality of receiving apertures aligns with each mounting aperture of the plurality of mounting apertures. A plurality of disk studs is selectively engageable with each mounting aperture of the plurality of mounting apertures. Each disk stud of the plurality of disk studs is configured to pass through each receiving aperture of the plurality of receiving apertures to engage each mounting aperture of the plurality of mounting apertures, thus securing the protective disk to the mounting disk. A second plurality of receiving apertures is disposed through the lower section of the mounting disk, such that each receiving aperture of the second plurality of receiving apertures aligns with each mounting aperture of the second plurality of mounting apertures. A plurality of wheel studs is selectively engageable with each mounting aperture of the second plurality of mounting apertures. Each wheel stud of the plurality of wheel studs is configured to pass through each receiving aperture of the second plurality of receiving apertures to engage each mounting aperture of the second plurality of mounting apertures, thus securing the mounting disk to the second wheel.

In a second alternative embodiment of the invention, the protective disk mounts to a second mounting disk that in turn mounts to a standard factory wheel. The second mounting disk has a flat side and a contoured side. The flat side is selectively engageable with the protective disk, and the contoured side is selectively engageable with a contour of the standard wheel. The contoured side of the second mounting disk is configured to adhere to the standard wheel with an adhesive, and the flat side of the second mounting disk is configured to adhere to the wheel side of the protective disk with the adhesive. It is imagined that the second mounting disk will be 3D printed to create the contoured side as an exact mate to the contour of the standard wheel.

Thus have been broadly outlined the more important features of the present wheel rim protective disk so that the detailed description thereof that follows may be better understood and in order that the present contribution to the art may be better appreciated.

BRIEF DESCRIPTION OF THE DRAWINGS

Figures

FIG. 5 is a front elevation exploded view of the alternative embodiment of the wheel rim protective disk.

DETAILED DESCRIPTION OF THE DRAWINGS

Figure 1:
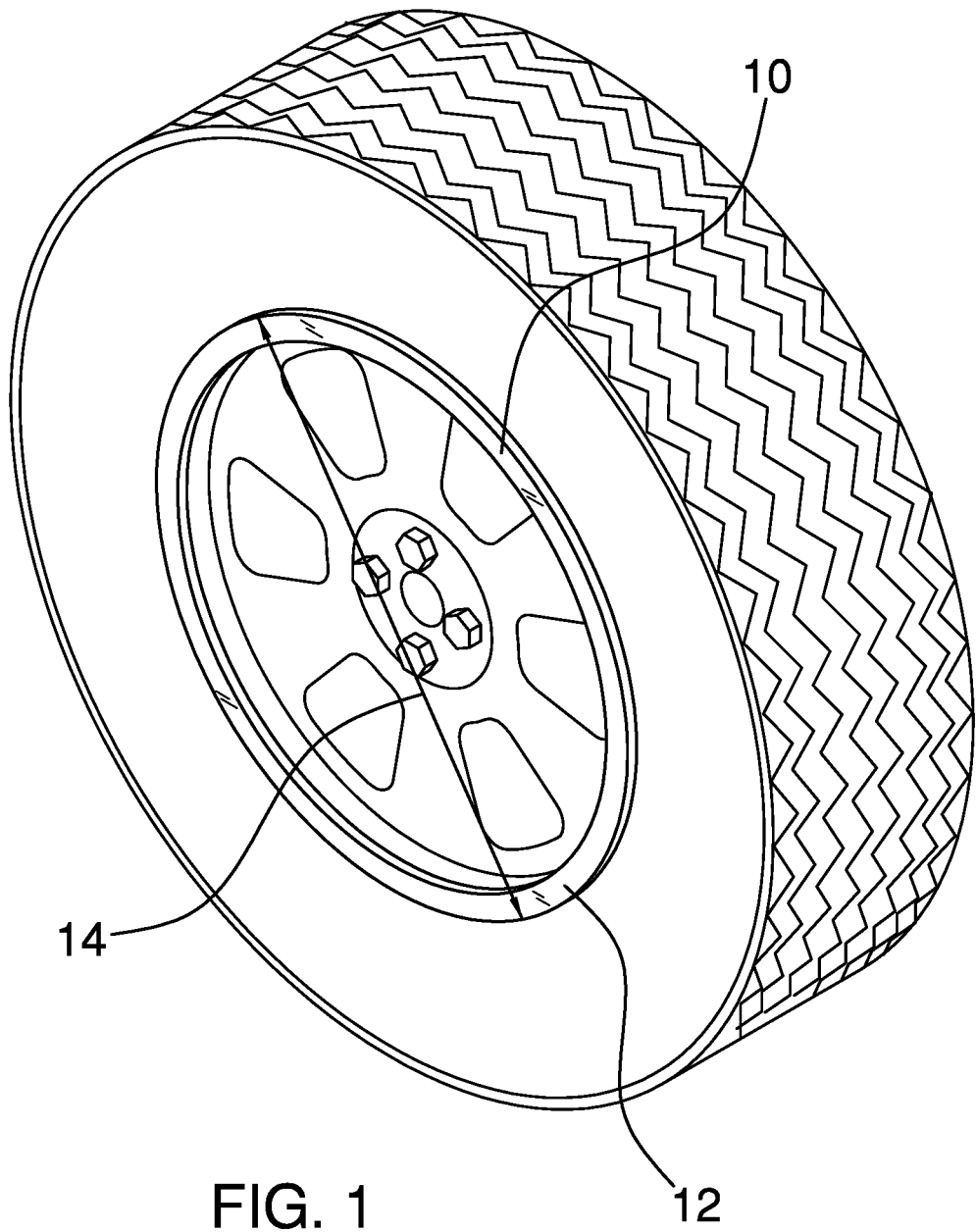
FIG. 1 is an isometric view of a wheel rim protective disk.
Figure 2:
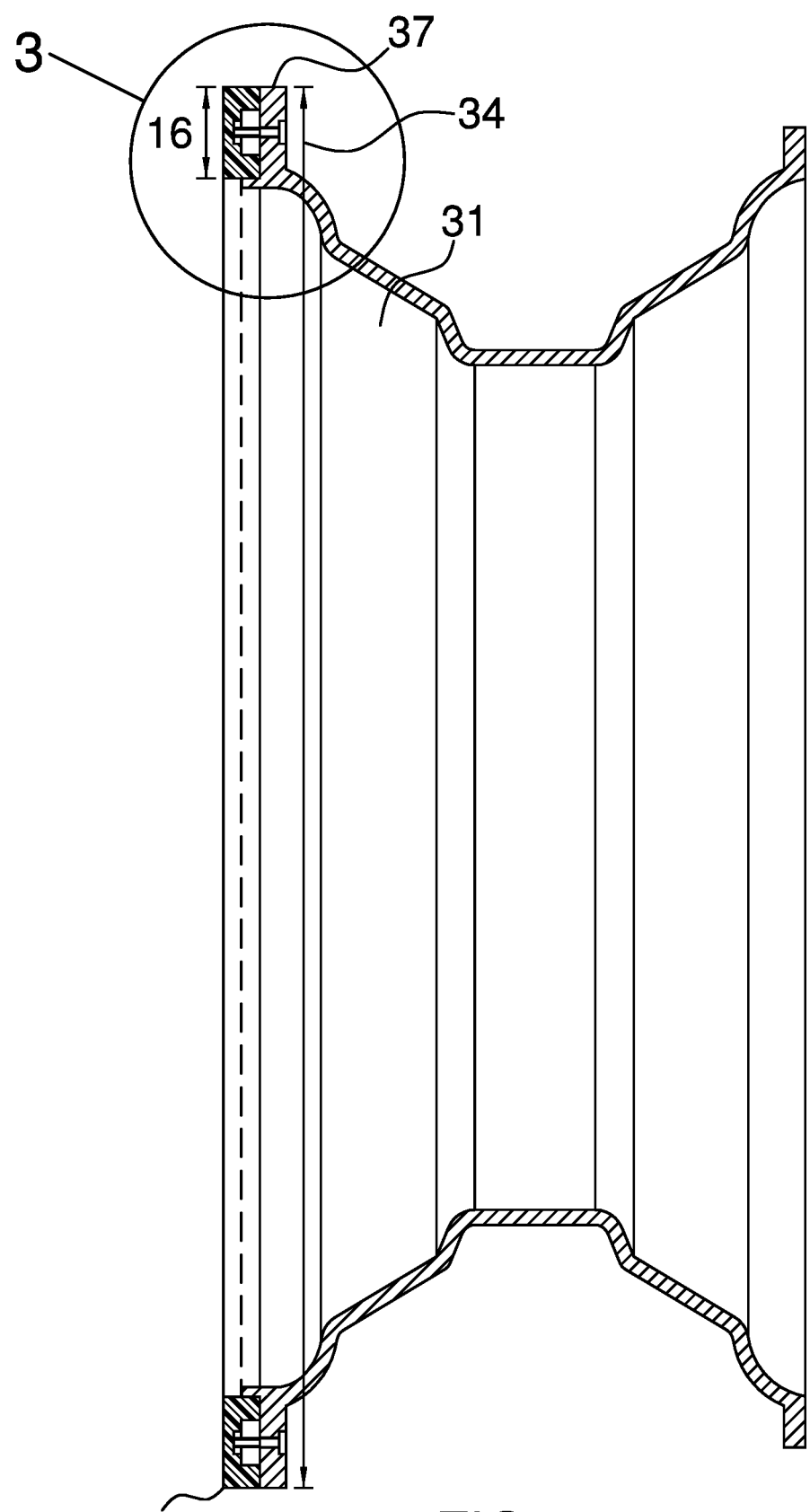
FIG. 2 is a cross-sectional view of the wheel rim protective disk mounted on a disk.
Figure 3:
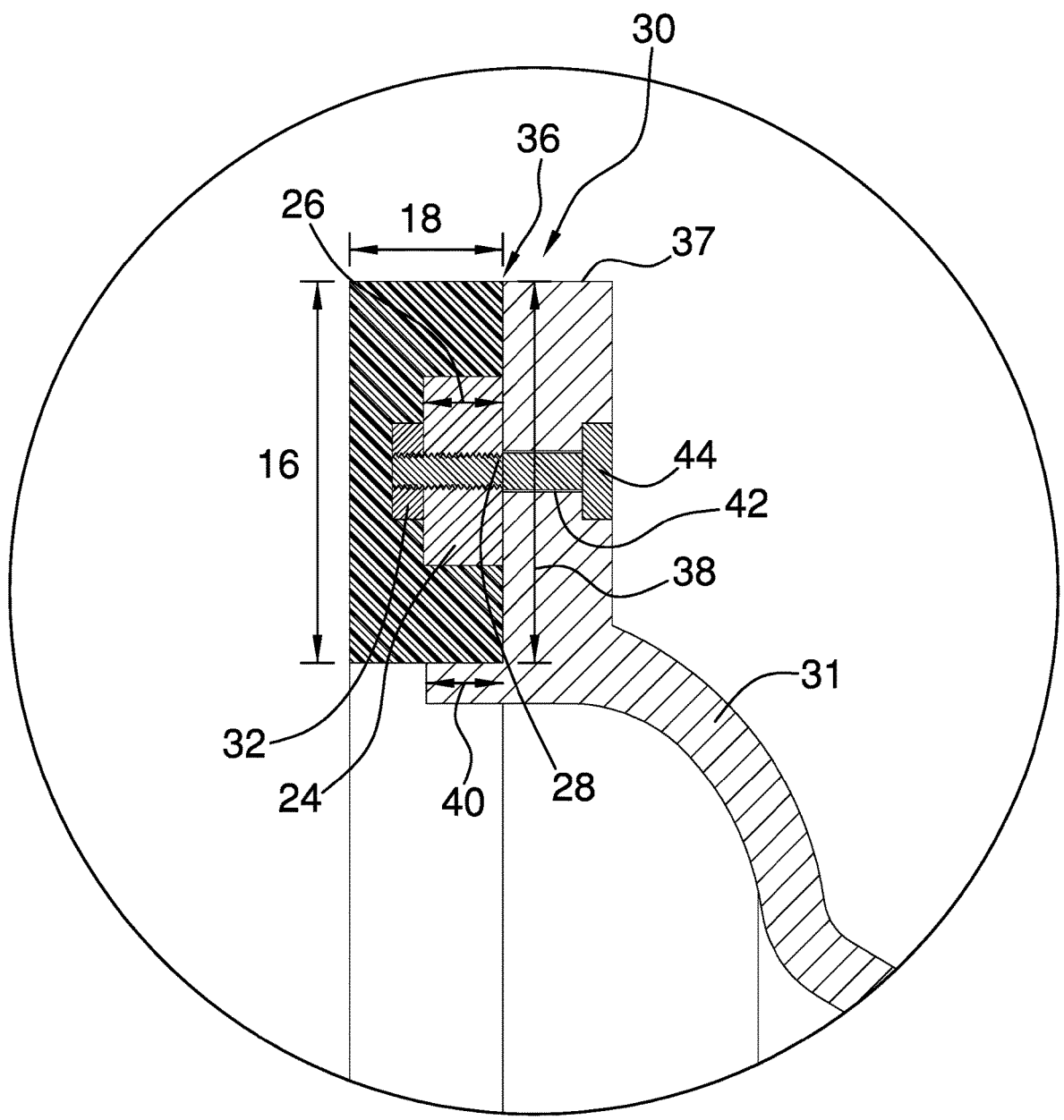
FIG. 3 is a detail view of area 3 of FIG. 2 of the wheel rim protective disk.
Figure 4:
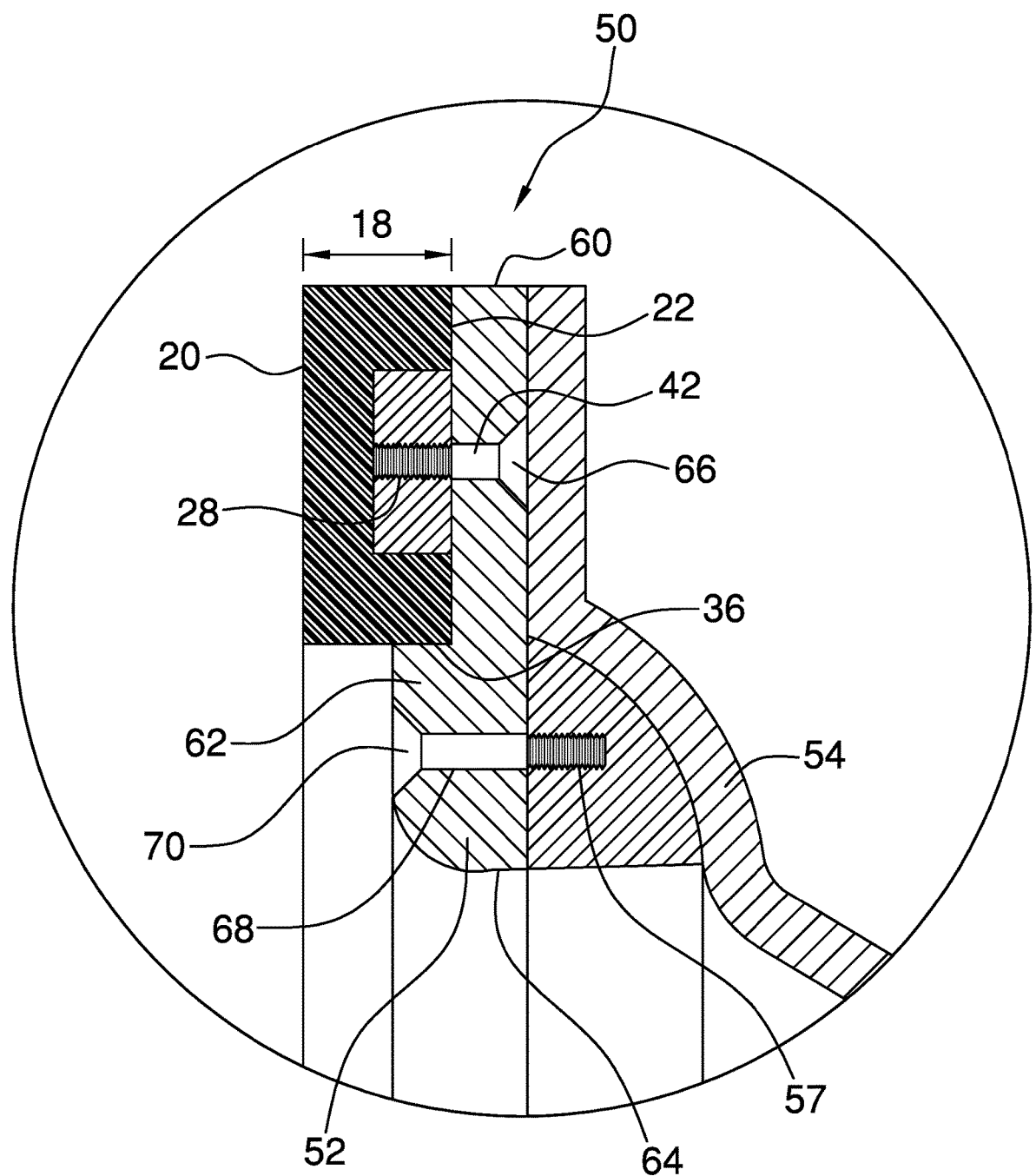
FIG. 4 is a detail view of area 3 of FIG. 2 of an alternative embodiment of the wheel rim protective disk.

With reference now to the drawings, and in particular FIGS. 1 through 5 thereof, an example of the instant wheel rim protective disk employing the principles and concepts of the present wheel rim protective disk and generally designated by the reference number 10 will be described.

Referring to FIGS. 1 through 5 the present wheel rim protective disk 10 is illustrated. The wheel rim protective disk 10 includes a protective disk 12 having an outer diameter 14, a width 16, a thickness 18, a curb side 20, and a wheel side 22. A reinforcement spine 24 is continuously disposed within the protective disk from the wheel side 22 to a depth 26, wherein the depth is less than the thickness 18 of the protective disk. A first plurality of mounting apertures 28 is disposed on the wheel side of the protective disk.

A first embodiment of the invention 30 includes a plurality of T-nuts 32, wherein each T-nut of the plurality of T-nuts is disposed within each mounting aperture of the first plurality of mounting apertures 28. This first embodiment of the invention mounts to a wheel 31 having a second outer diameter 34 substantially conforming to the outer diameter 14 of the protective disk, and a channel 36 continuously disposed along an outer edge 37 of the wheel. The channel has a second width 38 substantially conforming to the width 16 of the protective disk, and the channel has a second depth 40 less than the thickness 18 of the protective disk. A plurality of receiving apertures 42 is disposed through the channel of the wheel, wherein each receiving aperture of the plurality of receiving apertures aligns with each mounting aperture of the plurality of mounting apertures 28. A plurality of T-bolts 44 is selectively engageable with each T-nut of the plurality of T-nuts 32. Each T-bolt of the plurality of T-bolts 44 is configured to pass through each receiving aperture of the plurality of receiving apertures 42 to engage each T-nut of the plurality of T-nuts 32, thus securing the protective disk 12 to the wheel 31.

In an alternative embodiment of the invention 50, the protective disk 12 mounts to a mounting disk 52 that in turn mounts to a second wheel 54. The second wheel has a third outer diameter 56 substantially conforming to the outer diameter 14 of the protective disk, and a second plurality of mounting apertures 57. The mounting disk has a fourth outer diameter 58 substantially conforming to the outer diameter 14 of the protective disk, the channel 36 continuously disposed along an upper edge 60 of the mounting disk, and a lower section 62 from the channel to a lower edge 64 of the mounting disk.

The plurality of receiving apertures 42 is disposed through the channel 36 of the mounting disk, wherein each receiving aperture of the plurality of receiving apertures aligns with each mounting aperture of the plurality of mounting apertures 28. A plurality of disk studs 66 is selectively engageable with each mounting aperture of the plurality of mounting apertures. Each disk stud of the plurality of disk studs 66 is configured to pass through each receiving aperture of the plurality of receiving apertures 42 to engage each mounting aperture of the plurality of mounting apertures 28, thus securing the protective disk 12 to the mounting disk 52. A second plurality of receiving apertures 68 is disposed through the lower section 62 of the mounting disk, such that each receiving aperture of the second plurality of receiving apertures 68 aligns with each mounting aperture of the second plurality of mounting apertures 57. A plurality of wheel studs 70 is selectively engageable with each mounting aperture of the second plurality of mounting apertures 57. Each wheel stud of the plurality of wheel studs 70 is configured to pass through each receiving aperture of the second plurality of receiving apertures 68 to engage each mounting aperture of the second plurality of mounting apertures 57, thus securing the mounting disk 52 to the second wheel 54.

In a second alternative embodiment of the invention (not pictured), the protective disk 12 mounts to a second mounting disk (not pictured) that in turn mounts to a standard factory wheel.

What is claimed is:

1. A wheel rim protective device comprising:
   a protective disk having an outer diameter, a width, a thickness, a curb side, and a wheel side;
   a reinforcement spine continuously disposed within the protective disk from the wheel side to a depth, wherein the depth is less than the thickness of the protective disk; and
   a first plurality of mounting apertures disposed on the wheel side of the protective disk.

2. The wheel rim protective device of claim 1 further comprising:
   a plurality of nuts, wherein each nut of the plurality of nuts is disposed within each mounting aperture of the first plurality of mounting apertures;
   a wheel having a second outer diameter substantially conforming to the outer diameter of the protective disk, a channel continuously disposed along an outer edge of the wheel, wherein the channel has a second width substantially conforming to the width of the protective disk, wherein the channel has a second depth less than the thickness of the protective disk;
   a plurality of receiving apertures disposed through the channel of the wheel, wherein each receiving aperture of the plurality of receiving apertures aligns with each mounting aperture of the plurality of mounting apertures; and
   a plurality of T-bolts, wherein each T-bolt of the plurality of T-bolts is selectively engageable with each nut of the plurality of nuts, wherein each T-bolt of the plurality of T-bolts is configured to pass through each receiving aperture of the plurality of receiving apertures to engage each nut of the plurality of nuts to secure the protective disk to the wheel.

3. The wheel rim protective device of claim 1 further comprising:
- a second wheel having a third outer diameter substantially conforming to the outer diameter of the protective disk, and a second plurality of mounting apertures;
- a mounting disk having a fourth outer diameter substantially conforming to the outer diameter of the protective disk, a channel continuously disposed along an upper edge of the mounting disk, and a lower section from the channel to a lower edge of the mounting disk; wherein the channel has a second width substantially conforming to the width of the protective disk, wherein the channel has a second depth less than the thickness of the protective disk; a plurality of receiving apertures disposed through the channel of the mounting disk, wherein each receiving aperture of the plurality of receiving apertures aligns with each mounting aperture of the plurality of mounting apertures; and
- a plurality of disk studs, wherein each disk stud of the plurality of disk studs is selectively engageable with each mounting aperture of the plurality of mounting apertures, wherein each disk stud of the plurality of disk studs is configured to pass through each receiving aperture of the plurality of receiving apertures to engage each mounting aperture of the plurality of mounting apertures to secure the protective disk to the mounting disk;
- a second plurality of receiving apertures disposed through the lower section of the mounting disk, wherein each receiving aperture of the second plurality of receiving apertures aligns with each mounting aperture of the second plurality of mounting apertures; and a plurality of wheel studs, wherein each wheel stud of the plurality of wheel studs is selectively engageable with each mounting aperture of the second plurality of mounting apertures, wherein each wheel stud of the plurality of wheel studs is configured to pass through each receiving aperture of the second plurality of receiving apertures to engage each mounting aperture of the second plurality of mounting apertures to secure the mounting disk to the second wheel.

* * * * *